US011719524B2

(12) United States Patent
Ishibashi et al.

(10) Patent No.: US 11,719,524 B2
(45) Date of Patent: *Aug. 8, 2023

(54) METHOD AND SYSTEM FOR MEASURING TURBINE SHAPE

(71) Applicant: Mitsubishi Heavy Industries, Ltd., Tokyo (JP)

(72) Inventors: Koji Ishibashi, Yokohama (JP); Shunsuke Mizumi, Tokyo (JP); Kenji Yashirodai, Tokyo (JP); Jie Huang, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/521,183

(22) Filed: Nov. 8, 2021

(65) Prior Publication Data

US 2022/0057186 A1    Feb. 24, 2022

Related U.S. Application Data

(63) Continuation of application No. 16/833,140, filed on Mar. 27, 2020, now Pat. No. 11,215,437.

(30) Foreign Application Priority Data

Apr. 12, 2019  (JP) ................................ 2019-076520

(51) Int. Cl.
*G01B 5/016*  (2006.01)
*G01B 5/20*  (2006.01)

(52) U.S. Cl.
CPC .............. *G01B 5/016* (2013.01); *G01B 5/20* (2013.01)

(58) Field of Classification Search
USPC .......................................................... 33/503
See application file for complete search history.

(56) References Cited

U.S. PATENT DOCUMENTS 3,757,423 A    9/1973 Wieg
5,031,314 A    7/1991 Berrong et al.
(Continued)

FOREIGN PATENT DOCUMENTS

CN    101403612 B    10/2013
GB    2180117 A    3/1987
(Continued)

OTHER PUBLICATIONS

Extended European Search Report issued in European Application No. 20166549.4 dated Jul. 1, 2020 (10 pages).

(Continued)

*Primary Examiner* — Christopher W Fulton
(74) *Attorney, Agent, or Firm* — Crowell & Moring LLP

(57) ABSTRACT

A method and system for measuring a turbine shape is provided in which an appropriate measurement accuracy can be achieved that is sufficient to prevent a failure to recognize features of shape of a measurement object, with extension of a measurement time suppressed. In a turbine including casings, recesses and protrusions on flange surfaces of the casings are measured at measurement intervals M set on the basis of the entire length L of flange portions in an axial direction, the number of bolts N joining the flange portions, and intervals between the bolts in the axial direction of the flange portions.

2 Claims, 11 Drawing Sheets

(56) References Cited

U.S. PATENT DOCUMENTS

| | | | |
|---|---|---|---|
| 5,895,444 A * | 4/1999 | Ruck | G05B 19/401 |
| | | | 33/503 |
| 7,493,809 B1 | 2/2009 | Ward, Jr. | |
| 8,701,298 B2 * | 4/2014 | Jordil | G01B 5/012 |
| | | | 33/503 |
| 9,441,500 B2 | 9/2016 | Hori et al. | |
| 11,215,437 B2 * | 1/2022 | Ishibashi | G01B 5/004 |
| 2011/0260721 A1 | 10/2011 | Fischer | |
| 2013/0233064 A1 | 9/2013 | Ono | |
| 2015/0178412 A1 | 6/2015 | Grau | |
| 2015/0219451 A1 | 8/2015 | Pettersson | |
| 2017/0234670 A1 | 8/2017 | Fernando | |
| 2018/0307205 A1 | 10/2018 | Yashirodai | |
| 2019/0107007 A1 | 4/2019 | Yashirodai | |

FOREIGN PATENT DOCUMENTS

| | | |
|---|---|---|
| JP | 2007-32504 A | 2/2007 |
| JP | 2013-32922 A | 2/2013 |
| JP | 2019-49233 A | 3/2019 |

OTHER PUBLICATIONS

Hindi-language Office Action issued in Indian Application No. 202014014144 dated Mar. 10, 2021 with English translation (six (6) pages).

* cited by examiner

METHOD AND SYSTEM FOR MEASURING TURBINE SHAPE

CROSS REFERENCE TO RELATED APPLICATIONS

This application is a continuation of U.S. patent application Ser. No. 16/833,140, filed Mar. 27, 2020, now U.S. Pat. No. 11,215,437, issued Jan. 4, 2022, which claims priority from Japanese Patent Application No. 2019-076520, filed Apr. 12, 2019, the disclosures of which are expressly incorporated by reference herein.

BACKGROUND OF THE INVENTION

1. Field of the Invention

The present invention relates to a method and system for measuring a turbine shape.

2. Description of the Related Art

In general, a casing of a turbine including inner and outer casings is divided into an upper half casing and a lower half casing both having a half-split shape, and flange portions of the upper half and lower half casings are joined by bolts. The casing houses a diaphragm and the like included in a stationary body, a turbine rotor included in a rotating body rotating with respect to the stationary body, and the like.

In periodic inspection and performance improvement work for a turbine, the upper half casing and the lower half casing are separated from each other for the inspection or work, and after the inspection or work, assembly work is executed. For example, in assembly work in the performance improvement work in which a seal fin and the like are replaced to reduce the clearance between a turbine rotor and the seal fin to thereby decrease the amount of steam, i.e., working fluid, flowing through the clearance, the clearance needs to be strictly managed to prevent contact between the turbine rotor and the seal fin.

On the other hand, the casing and the like of the turbine operated for a long time under high temperature and high pressure are plastically deformed, and thus the amount of adjustment for the casing and built-in components in the assembly work needs to be accurately predicted. The prediction of the amount of adjustment needs the amount of movement occurring when a horizontal surface of the flange portion of the deformed casing is clamped. Determination of the amount of movement needs accurate measurement of the amount of deformation of the flange surface of the casing.

As a technique related to measurement of such a turbine, for example, JP-2013-32922-A discloses a three-dimensional measurement method including a first step of measuring, in measuring dimensions of a measurement object mainly including a flat surface, a cylinder, and a curved surface, the overall shape using a non-contact coordinate measuring machine to generate three-dimensional shape data regarding the overall shape, a second step of dividing the measurement object into the flat surface, the cylinder, and the curved surface portion and measuring these portions using a laser tracking non-contact measuring machine and a laser tracking contact measuring machine, a third step of generating three-dimensional shape data regarding the curved surface portion on the basis of data obtained from the laser tracking non-contact measuring machine in the second step, a fourth step of performing computation on the flat surface and the cylinder on the basis of data obtained from the laser tracking contact measuring machine in the second step, a fifth step of receiving an input of main portion dimensions manually obtained, a sixth step of synthesizing the data obtained in the first, third, fourth, and fifth steps, and a seventh step of creating design data on the basis of the data obtained in the sixth step.

SUMMARY OF THE INVENTION

In the related art, the laser tracking non-contact coordinate measuring machine and the laser tracking contact measuring machine are used to measure the casing or the like of the turbine as a measurement object. However, in a case where non-contact measurement is performed using a technique, for example, laser scan, then due to the presence of obstacles such as casing bolts in the bolt-joined portions of the upper half casing and the lower half casing, the measurement may be affected by shadows of the obstacles, reflection from glossy surfaces, and external factors such as illumination and sunlight. This may lead to a reduced measurement accuracy. Additionally, in contact measurement, the measurement needs to be performed at more measurement points to achieve the appropriate accuracy of the shape of the measurement object that is recognized on the basis of the measurement results. However, an increased number of measurement points may increase the amount of measurement time, and a power generation loss may enormously increase due to an increased construction cost attributed to the extended measurement time and operation delay associated with process delay. On the other hand, a casual reduction in measurement points may decrease the accuracy, and thus both measurement accuracy and measurement time need to be considered for setting of measurement points.

In light of the above-described circumstances, an object of the present invention is to provide a method and system for measuring a turbine shape, in which an appropriate measurement accuracy can be achieved that is sufficient to prevent a failure to recognize features of the shape of the measurement object, with extension of the measurement time suppressed.

An aspect of present invention includes a plurality of means for accomplishing the above-described object, and an example of the means is a method for measuring a turbine shape of a turbine including a casing having an upper half casing and a lower half casing with respective flange portions joined by bolts, a stationary body housed inside the casing, and a rotating body housed inside the casing and rotating with respect to the stationary body, the method including measuring, along an axial direction, recesses and protrusions on respective contact surfaces of the flange portions of the casing disassembled into the upper half casing and the lower half casing at measurement intervals predetermined on a basis of an entire length of the flange portions in the axial direction, the number of bolts joining the flange portions, and intervals between the bolts in the axial direction of the flange portions.

According to the aspect of the present invention, the appropriate measurement accuracy can be achieved that is sufficient to prevent a failure to recognize the features of the shape of the measurement object, with extension of the measurement time suppressed.

DESCRIPTION OF THE PREFERRED EMBODIMENTS

Embodiments of the present invention will be described below with reference to the drawings.

First Embodiment

A first embodiment of the present invention will be described with reference to FIGS. 1 to 9.

Figure 1:
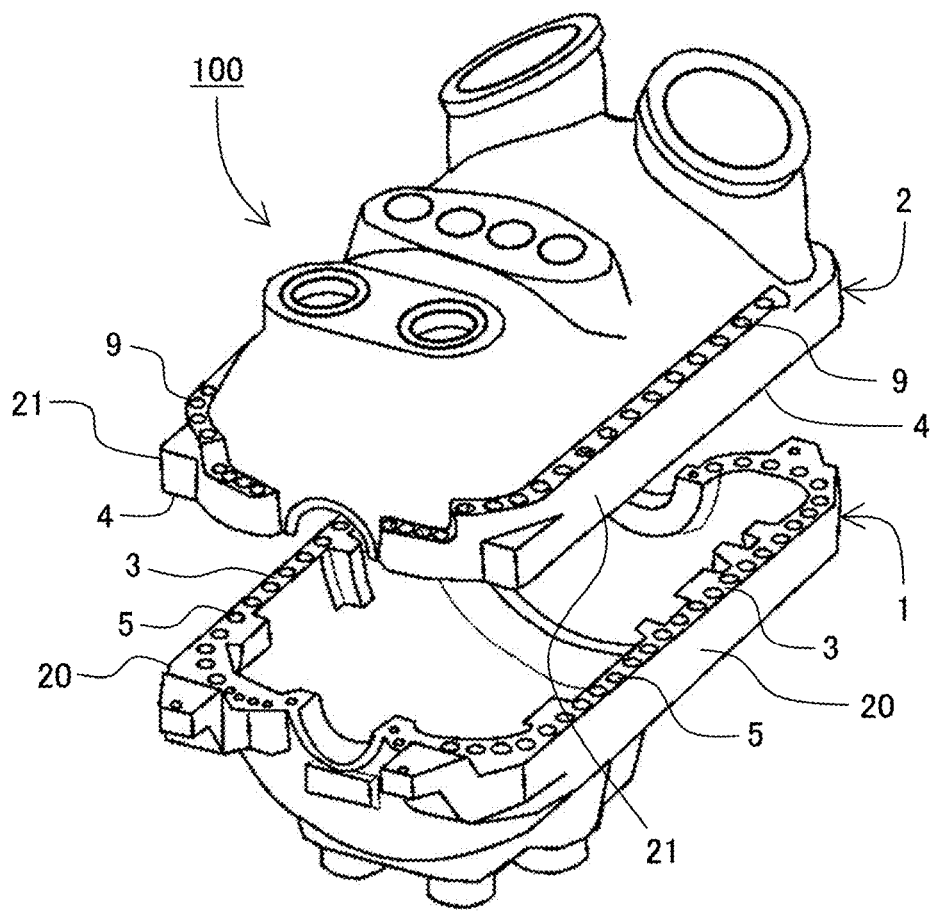
FIG. 1 is a perspective view illustrating an outer casing of a steam turbine illustrated as an example of a turbine, which is disassembled into a lower half of outer casing and an upper half of outer casing.
Figure 2:
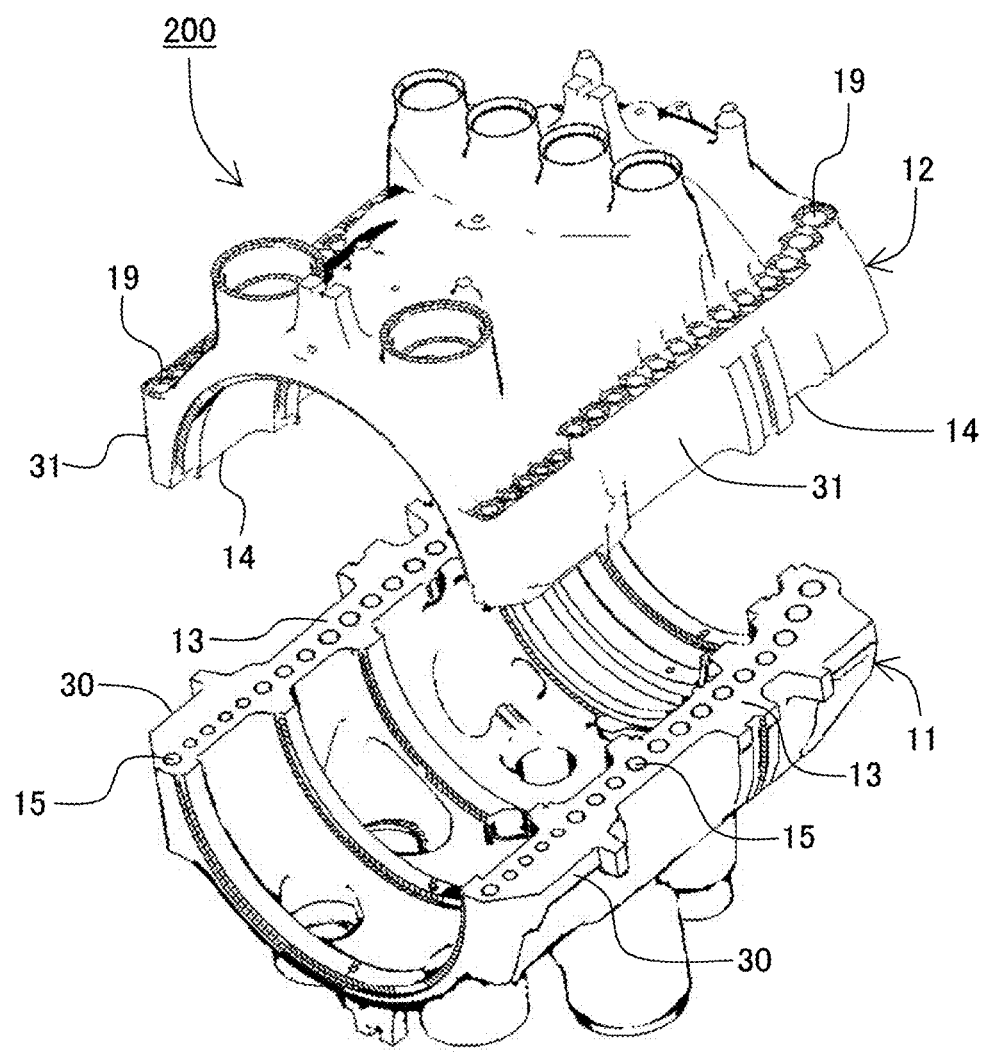
FIG. 2 is a perspective view illustrating an inner casing of the steam turbine which is disassembled into a lower half of inner casing and an upper half of inner casing.

FIG. 1 is a perspective view illustrating an outer casing of a steam turbine as an example of a turbine, which is disassembled into a lower half of outer casing and an upper half of outer casing. Additionally, FIG. 2 is a diagram illustrating an inner casing of the steam turbine, which is disassembled into a lower half of inner casing and an upper half of inner casing.

The steam turbine includes a rotating body including a rotor or the like, a stationary body including a blade ring or the like including a diaphragm, a blade ring, a packing ring, a dummy ring, or the like, the rotating body and the stationary body not being illustrated, and an outer casing 100 and an inner casing 200 including flange portions 21 and 31 of an upper casing, i.e., upper half of outer casing 2 and upper half of inner casing 12, and flange portions 20 and 30 of a lower casing, i.e., lower half of outer casing 1 and lower half of inner casing 11, joined by bolts, the rotating body and the stationary body being housed inside the outer casing 100 and the inner casing. Note that a certain type of stationary body is installed outside the outer casing 100 or the inner casing 200.

The outer casing 100 is formed by aligning a position of an upper flange surface 3 of the flange portion 20 of the lower half of outer casing 1 with a position of a lower flange surface 4 of the flange portion 21 of the upper half of outer casing 2 with the upper flange surface 3 and the lower flange surface 4 placed in contact with each other and facing each other, and by joining the flange portions 20 and 21 of the lower half of outer casing 1 and the upper half of outer casing 2 to be clamped by joint bolts via bolt holes 5 and 9 formed in the respective flange portions 20 and 21.

Similarly, the inner casing 200 is formed by aligning a position of an upper flange surface 13 of the flange portion 30 of the lower half of inner casing 11 with a position of a lower flange surface 14 of the flange portion 31 of the upper half of outer casing 12, with the upper flange surface 13 and the lower flange surface 14 placed in contact with each other and facing each other, and by joining the flange portions 30 and 31 of the lower half of outer casing 11 and the upper half of outer casing 12 to be clamped by joint bolts via bolt holes 15 and 19 formed in the respective flange portions 30 and 31.

For accurate and smooth execution of assembly work for such a turbine, i.e., steam turbine, adjusting work, i.e., alignment work, needs to be executed through measuring the positions of the stationary body in the outer casing 100 and the inner casing 200 with reference to the rotating body adjusted to the correct position. However, in the outer casing 100 and the inner casing 200 in the steam turbine operated for a certain period, the flange surfaces 3, 4, 13, and 14 may be deformed due to the effect of creep.

Figure 5:
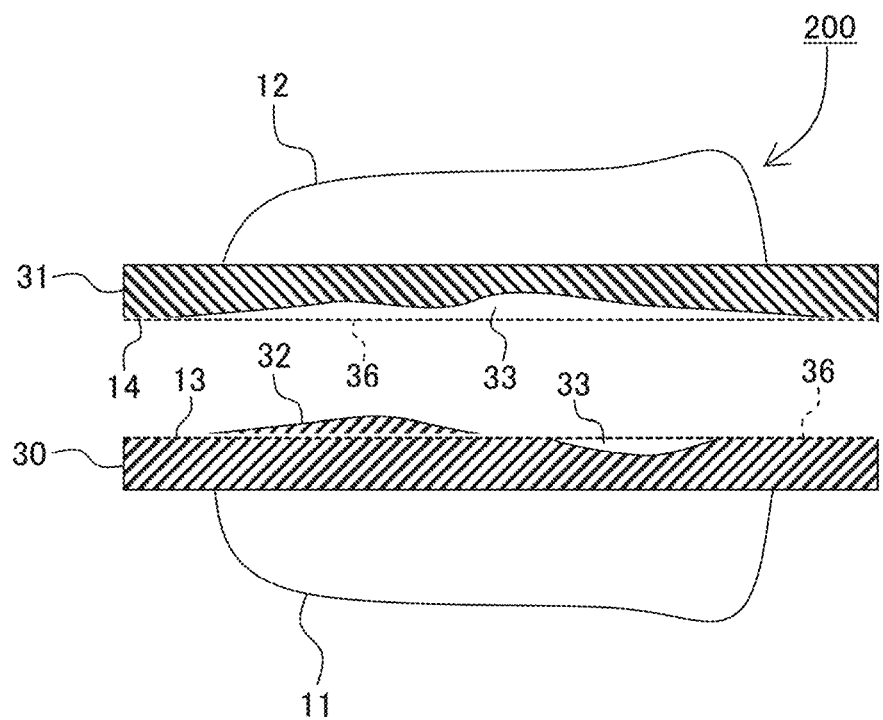
FIG. 5 is a cross-sectional view schematically illustrating a flange portion of the inner casing.

FIG. 5 is a cross-sectional view schematically illustrating the flange portion of the inner casing. Additionally, FIG. 6 is a plan view illustrating an extracted part of the flange portion of the inner casing.

Figure 6:
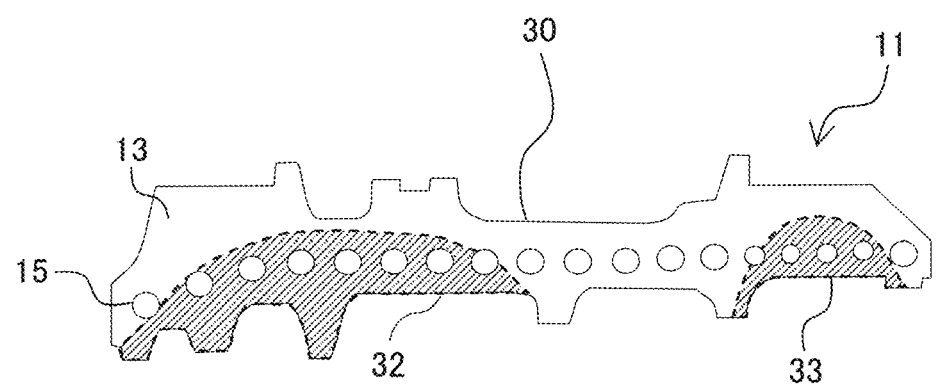
FIG. 6 is a plan view illustrating an extracted part of the flange portion of the inner casing.

As illustrated in FIG. 5 and FIG. 6, in the steam turbine operated for a certain period, when the flange portions 30 and 31 of the lower half of inner casing 11 and the upper half of inner casing 12 are joined together to be clamped by the joint bolts with the flange surfaces 13 and 13 placed in contact with each other and facing each other, the flange surfaces 13 and 14 may be deformed due to the effect of creep or the like such that protrusion-shaped portions, i.e., protruding portions 32, recess-shaped portions, i.e., recessed portions 33, and the like are formed on a planar shape, i.e., designed shape, obtained during manufacturing. This also applies to the lower half of outer casing 1 and the upper half of outer casing 2 of the outer casing 100.

The alignment work for the outer casing 100 and the inner casing 200 as described above requires measurement of the surface shapes of the flange surfaces 3 and 4 and 13 and 14 in contact with each other, prediction, on the basis of measurement results, of the amount of displacement of the casing caused by deformation of the flange surfaces 3, 4, 13, and 14 and computation of the appropriate amount of adjustment for the positions of the stationary body and the like.

Now, the basic principle of the measuring method according to the present embodiment will be described.

Figure 7:
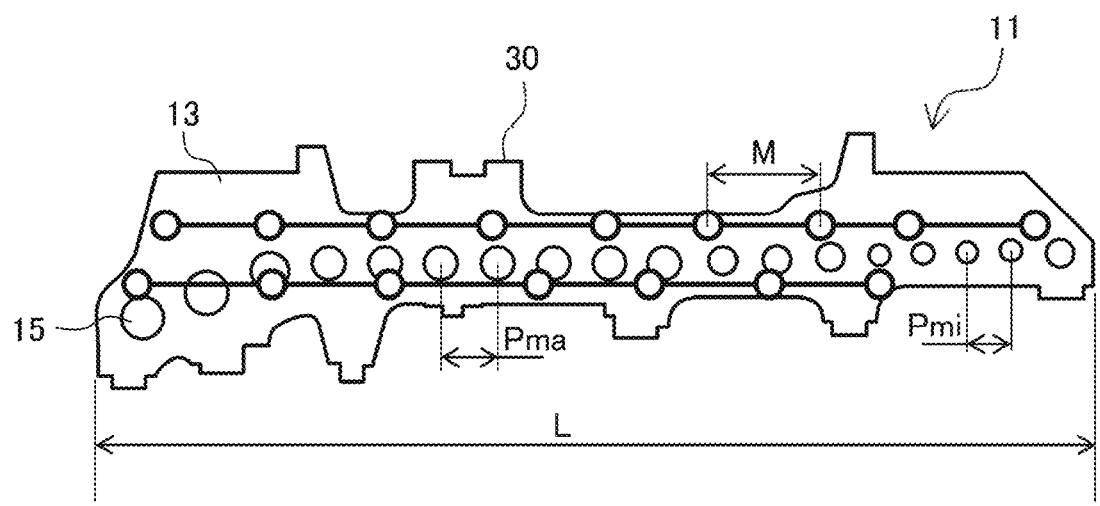
FIG. 7 is a diagram illustrating a method for measuring a flange surface of the lower half of inner casing.

FIG. 7 is a diagram illustrating a method for measuring the flange surface of the lower half of inner casing.

Note that, in the present embodiment, the flange surface 13 of the lower half of inner casing 11 among the flange surfaces 3, 4, 13, and 14 of the outer casing 100 and the inner casing 200, will be representatively described, but a similar measuring method can be applied to the other flange surfaces 3, 4, and 14.

As illustrated in FIG. 7, in the present embodiment, measurement intervals M represented by (Equation 1) below are predetermined on the basis of an entire length L of the flange portion 30 in an axial direction, the number of bolts, i.e., the number of bolt holes 15, N joining the flange portion 30, and intervals between the bolts, i.e., maximum pitch Pma and minimum pitch Pmi, in the axial direction of the flange portion 30, and at intervals equal to or smaller than the measurement intervals M, the flange surface 13 is measured along the axial direction, for example, for the inner side and the outer side of the lower half of inner casing 11.

$$M=(L/N)\times(Pmi/Pma) \quad \text{(Equation 1)}$$

(Equation 1) described above is experimentally and empirically determined in light of a reduction in the number of measurement points affecting the measurement time and an increase in the number of measurement points affecting measurement accuracy. Measurement of the flange surface 13 based on (Equation 1) allows achievement of an appropriate measurement accuracy sufficient to prevent a failure to recognize features of the shape of the measurement object, with extension of the measurement time suppressed.

Figure 3:
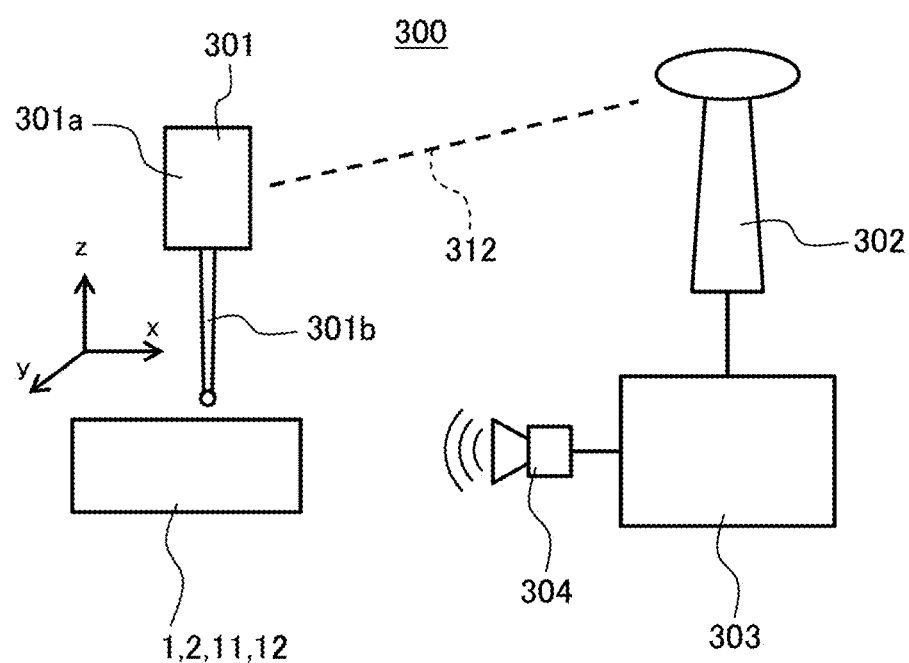
FIG. 3 is a diagram schematically illustrating a general configuration of a measuring system.

FIG. 3 is a diagram schematically illustrating a general configuration of a measurement system according to the present embodiment.

In FIG. 3, a measurement system 300 is used to measure the flange surfaces 3, 4, 13, and 14 and includes a point probe 301 including a probe main body 301a and a rod-shaped probe member 301b having a base end fixed to the probe main body 301a and a tip brought into contact with the measurement object, e.g., each of the flange surfaces 3, 4, 13, and 14 of the casing 1, 2, 11, and 12, a probe position sensor 302 sensing the position and direction of the point probe 301 in a predetermined coordinate system including the casings 1, 2, 11, and 12, and a controller 303 calculating the position of the tip of the probe member 301b in the coordinate system on the basis of a sensing result from the probe position sensor 302.

The measurement system 300 employs, for example, a method of using laser light 312 to sense the position and direction of the point probe 301 to thereby measure the position of the tip of the probe member 301b. The probe position sensor 302 as a laser tracker accurately senses a plurality of reference points provided on the probe main body 301a to allow identification of the position, in the coordinate system, of the tip of the probe member 301b with the predetermined shape. In other words, by acquiring the position, i.e., coordinates, of the tip of the probe member 301b in contact with the measurement object, the surface position, i.e., coordinates, of the measurement object can be acquired. Additionally, by replacing the probe member 301b with probe members having different lengths or shapes and updating shape information on the probe member 301b used for position computation, an object with a more complicated shape can be measured.

The controller 303 sets measurement points, i.e., positions of the measurement points with which the tip of the probe member 301b is brought into contact, on the flange surface 13 along the axial direction at intervals equal to or smaller than the measurement interval M computed in accordance with (Equation 1) described above, and constantly measures the position of the probe main body 301a, that is, the position of the tip of the probe member 301b. In a case where a distance between the measurement point and the tip of the probe member 301b is within a predetermined range, the controller 303 notifies, via a notification device (for example, a speaker 304 or a tablet or a smart watch connected to the controller 303 wirelessly or by a cable may be used), an operator of the point probe 301 that the tip of the probe member 301b is close to any of the measurement points. In accordance with the notification from the notification device, the operator performs an operation triggering information acquisition such as depression of a measurement button, with the tip of the probe member 301b in contact with the surface of the measurement object, which is, in this case, synonymous with the measurement point, to measure the surface shape of the measurement object, i.e., position coordinates of the surface.

Figure 4:
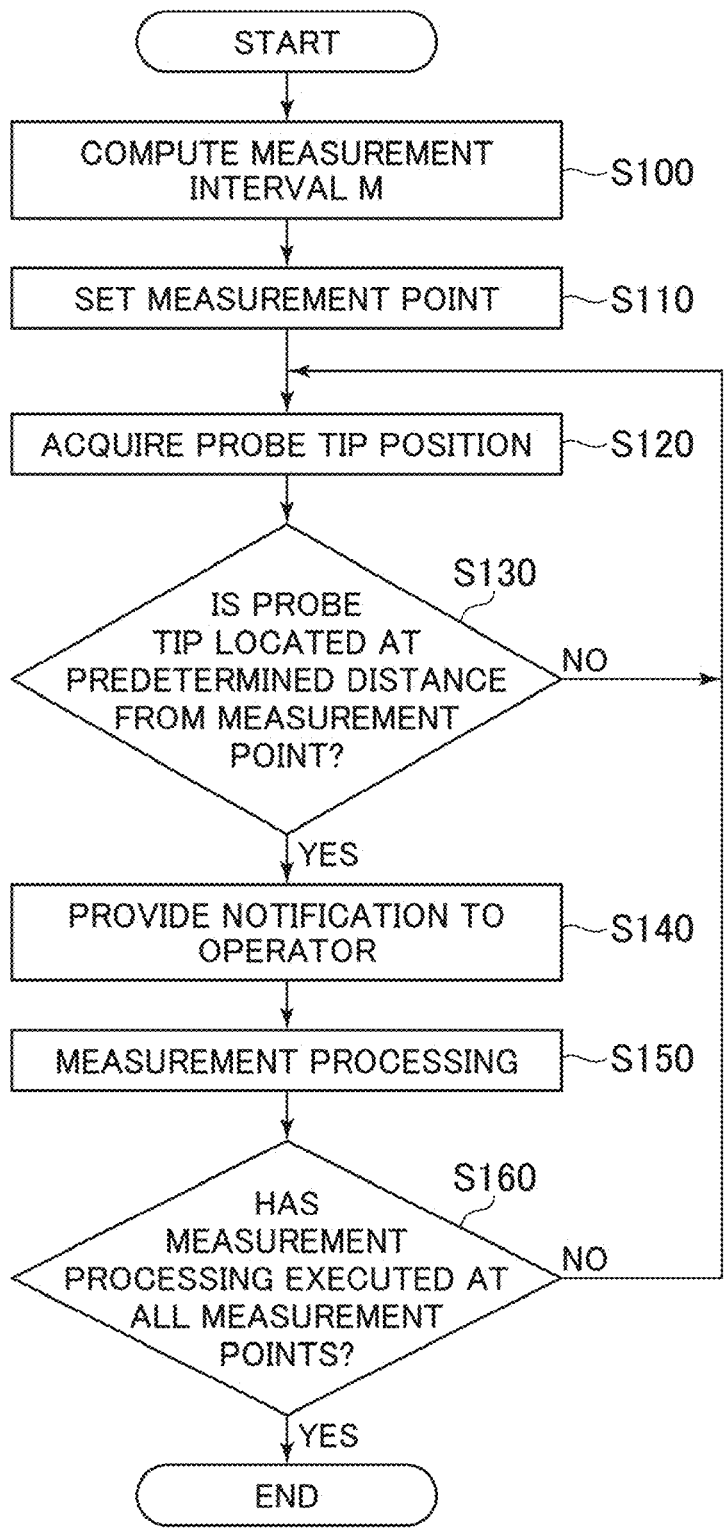
FIG. 4 is a flowchart illustrating a processing procedure for measurement processing.

FIG. 4 is a flowchart illustrating a processing procedure for measurement processing.

As illustrated in FIG. 4, the controller 303 first calculates the measurement intervals M on the basis of (Equation 1) described above in step S100, and sets the measurement points on the flange surface 13 along the axial direction on the basis of the measurement intervals M, in step S110.

Subsequently, the controller 303 acquires, from the probe position sensor 302, information regarding the position and direction of the point probe 301, and calculates and acquires the position coordinates of the tip of the probe member 301b, in step S120. Then, the controller 303 determines whether the tip of the probe member 301b is within the range of a predetermined distance from the measurement point, that is, whether within a range allowable for the measurement points, in step S130.

In a case where the determination result in step S130 is YES, the controller 303 notifies, via the notification device, the operator that measurement is allowed, in step S140. When the operator executes measurement processing, that is, processing of acquiring the position coordinates with the tip of the probe member 301b in contact with the measurement object in step S150, the controller 303 subsequently determines whether the measurement processing has been executed at all the measurement points, in step S160. In a case where the determination result is YES, the controller 303 ends the processing.

Additionally, in a case where the determination result in step S130 is NO or the determination result in step S160 is NO, the processing returns to step S120.

The advantages of the present embodiment configured as described above will be described.

Figure 8:
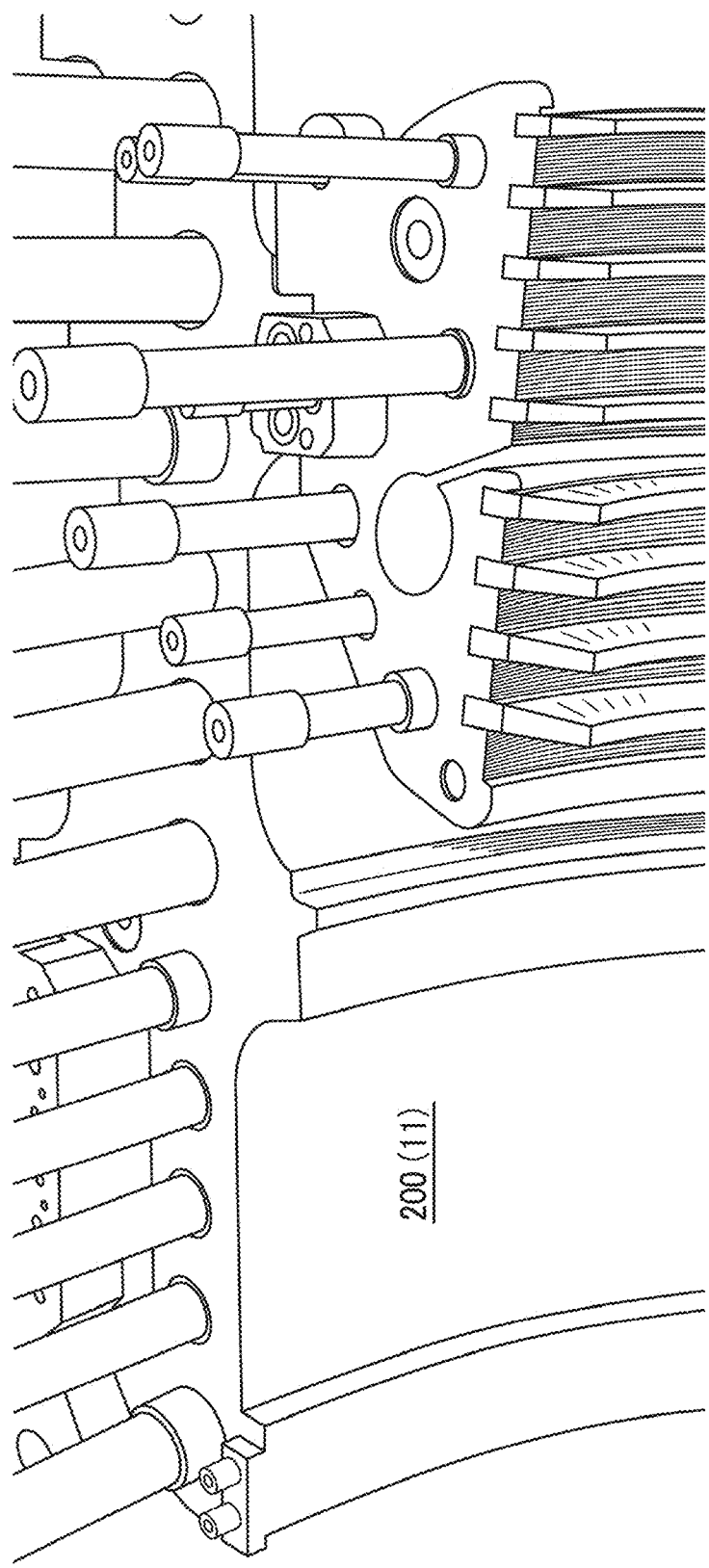
FIG. 8 is a diagram illustrating an extracted part of the flange portion of the lower half of inner casing in detail.

FIG. 8 is a diagram illustrating an extracted part of the lower half of inner casing in detail.

For example, in a case where the casing or the like of the turbine, as the measurement object, is measured using a laser tracking non-contact coordinate measuring machine or a laser tracking contact measuring machine as in the related art, accurate measurement of the flange portions is difficult because the flange portions include obstacles such as joint bolts as illustrated in FIG. 8. Additionally, in a case where non-contact measurement is performed using a technique such as laser scan, the measurement may be affected by shadows of the obstacles, reflection from glossy surfaces, and external factors such as illumination and sunlight. This may lead to a reduced measurement accuracy. On the other hand, a contact measuring instrument or a non-contact measuring instrument may be used to perform detailed measurement over a long time in light of conditions such as obstacles. However, the extended measurement time leads to an enormous increase in construction cost or power generation loss. Thus, this method is not appropriate for improving the measurement accuracy.

In contrast, according to the present embodiment, in the turbine including the casing having the outer casing 100 and inner casing 200 respectively including the flange portions 21 and 31 of the upper half casing, i.e., upper half of outer casing 2 and upper half of inner casing 12, and the flange portions 20 and 30 of the lower half casing, i.e., lower half of outer casing 1 and lower half of inner casing 11, joined by bolts, the stationary body housed inside the casing, and the rotating body housed inside the casing and rotating with respect to the stationary body, recesses and protrusions on the contact surfaces, e.g., flange surfaces 3, 4, 13, and 14, of the flange portions 20, 21, 30, and 31 of the casing disassembled into the upper casing and the lower casing are measured along the axial direction, at the measurement intervals M predetermined in accordance with Equation 1 described above on the basis of the entire length L of the flange portion 30 in the axial direction, the number of bolts, i.e., the number of bolt holes, N joining the flange portion 30, and the intervals between the bolts, i.e., maximum pitch Pma and minimum pitch Pmi, in the axial direction of the flange portion 30. Thus, an appropriate measurement accuracy can be achieved that is sufficient to prevent a failure to recognize features of the shape of the measurement object, with extension of the measurement time suppressed.

Figure 9:
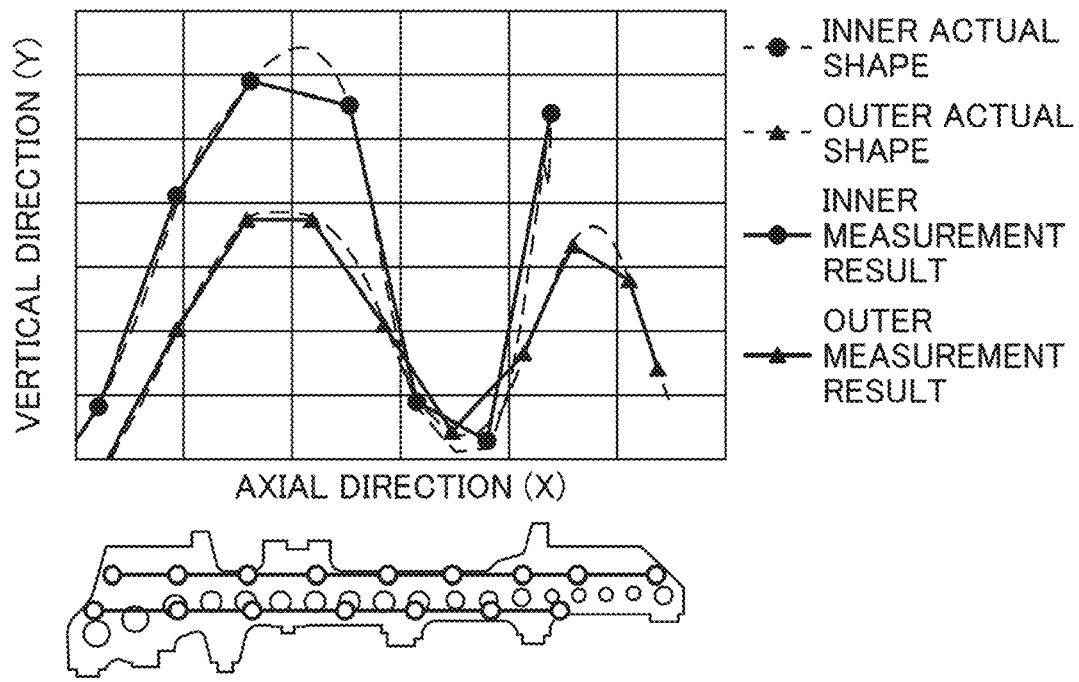
FIG. 9 is a diagram illustrating, as a comparative example, an example of measurement results for the flange surface obtained using the related art.
Figure 10:
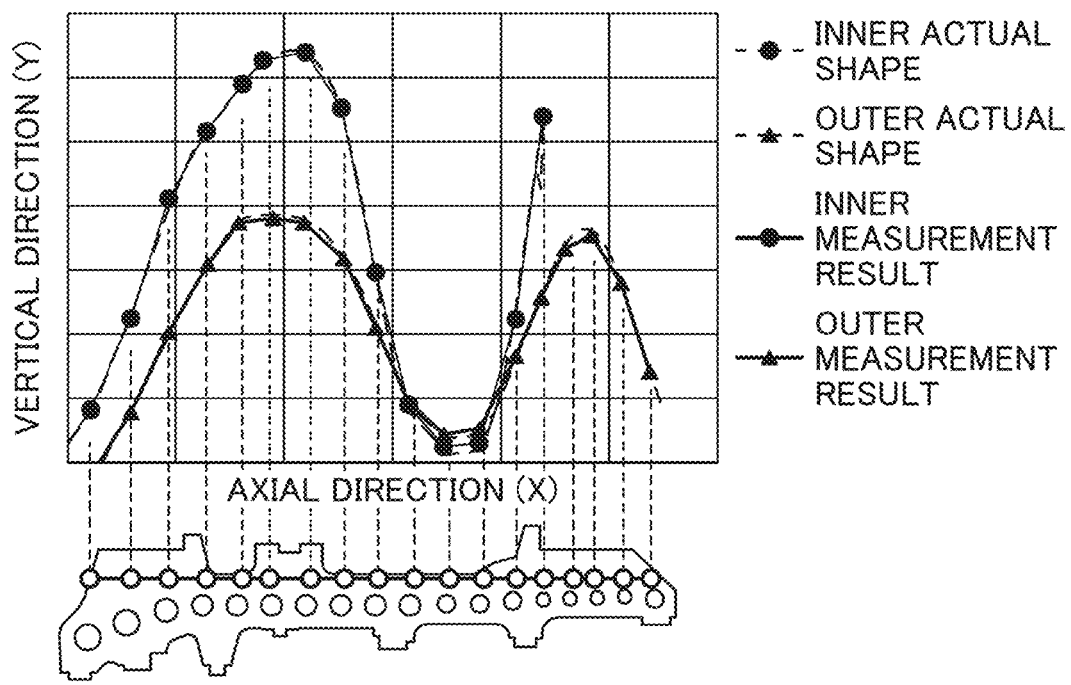
FIG. 10 is a diagram illustrating an example of measurement results for the flange surface according to the present embodiment.

FIG. 9 and FIG. 10 are diagrams illustrating an example of measurement results for the flange surface. FIG. 9 is a diagram illustrating, as a comparative example, an example of measurement results obtained using the related art. FIG. 10 is a diagram illustrating an example of measurement results according to the present embodiment.

As illustrated in FIG. 9, with increased intervals between the measurement points, the number of measurement points is reduced, but the measurement results deviate from the actual shape in some aspects such as the peak of displacement of the actual shape in the vertical direction, i.e., Y direction. Thus, this method does not allow the features of the shape of the measurement object to be accurately recognized.

In contrast, as illustrated in FIG. 10, in a case where the measurement intervals determined on the basis of (Equation 1) described above are used for the measurement, the features of the shape of the measurement object can be accurately recognized with an increase in the number of measurement points suppressed. This indicates that the appropriate measurement accuracy can be achieved, with extension of the measurement time suppressed.

Modified Example of First Embodiment

A modified example of the first embodiment will be described with reference to FIG. 11 and FIG. 12.

In the present modified example, the measurement intervals M are weighted such that the measurement intervals M are smaller at positions in the outer casing 100 and the inner casing 200 where significant displacement is predicted to occur.

Figure 11:
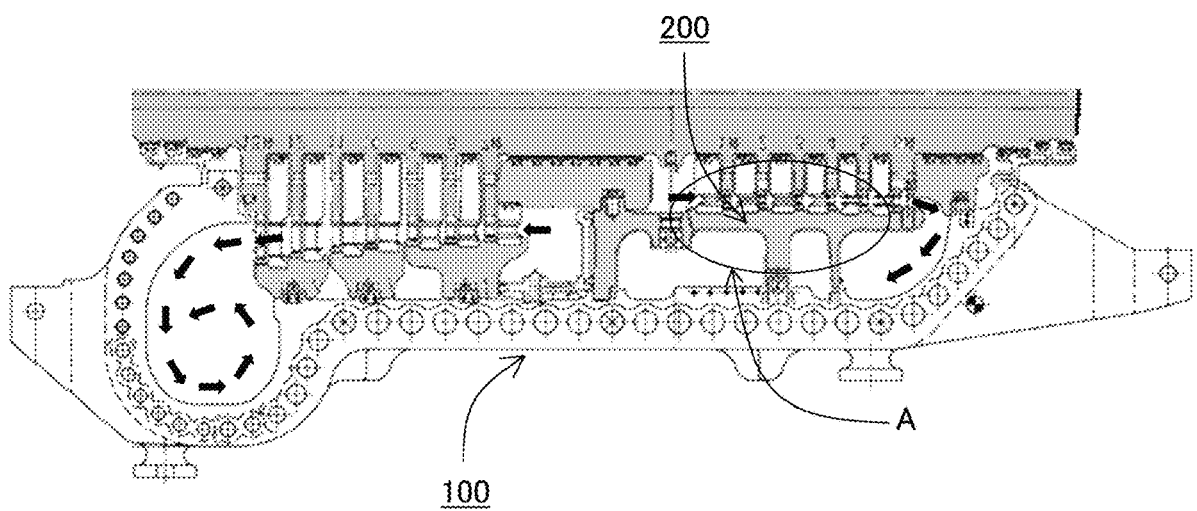
FIG. 11 is a diagram illustrating an example of a flow of steam inside the casing.

FIG. 11 is a diagram illustrating an example of a flow of steam inside the casing. Additionally, FIG. 12 is a diagram illustrating an example of measurement results for the flange surface.

Figure 12:
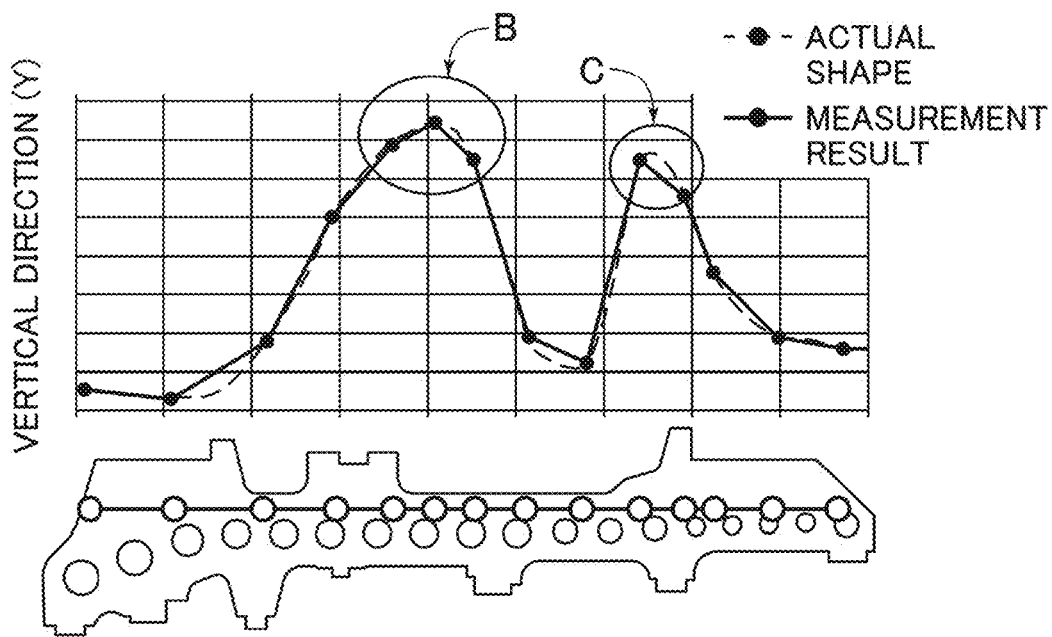
FIG. 12 is a diagram illustrating an example of measurement results for the flange surface.

As illustrated in FIG. 11, the displacement of the flange surface tends to be more significant in a range A in which the inner casing 200 is exposed to hot steam and has high temperature than in the other areas with lower temperature as illustrated in a range B and a range C in FIG. 12. Additionally, in the outer casing 100 and the inner casing 200, the displacement of the flange surface tends to be more significant in areas susceptible to restraint by piping and reaction force attributed to elongation. Thus, as represented by (Equation 2) below, a weight variable Z is introduced such that the measurement intervals M are reduced in areas where the displacement of the flange surface tends to be significant.

$$M = (L/N) \times (Pmi/Pma) \times Z \quad \text{(Equation 2)}$$

The weight variable Z is set to vary on the basis of areal temperature or any other factor.

The remaining part of the configuration is similar to the corresponding part of the first embodiment.

The present modified example configured as described above can produce advantages similar to the advantages of the first embodiment.

Additionally, the measurement intervals M are computed to correspond to the temperature or any other factor affecting the amount of displacement of the flange surface, thus enabling an increase in measurement accuracy.

Second Embodiment

A second embodiment of the present invention will be described below with reference to FIGS. 13 to 16.

In the present embodiment, the measurement of the flange surface is performed not only in the axial direction but also in the width direction.

Figure 13:
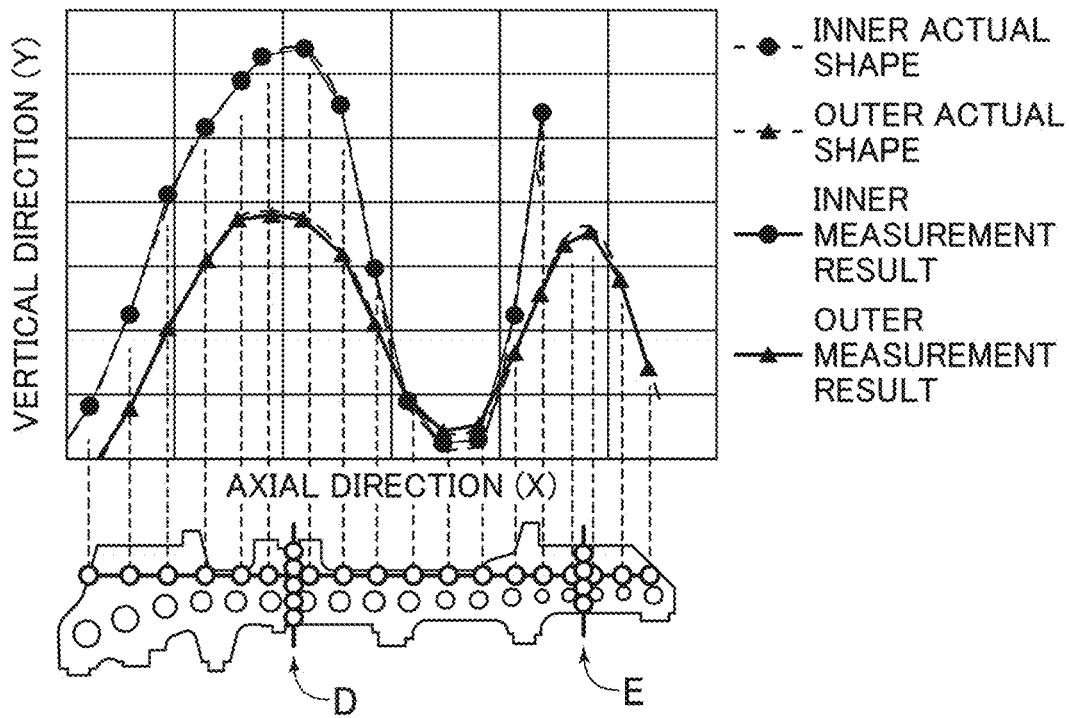
FIG. 13 is a diagram illustrating an example of measurement results for the flange surface.
Figure 14:
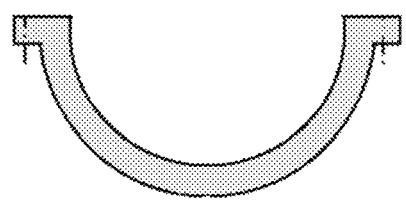
FIG. 14 is a diagram schematically illustrating a cross section of the lower half of inner casing taken across a surface perpendicular to an axial direction with the flange surface not displaced in a width direction.
Figure 15:
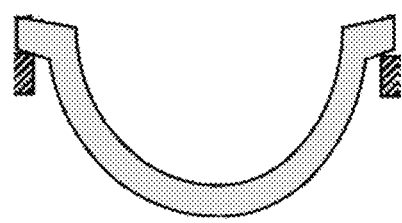
FIG. 15 is a diagram schematically illustrating a cross section of the lower half of inner casing taken across the surface perpendicular to the axial direction with the flange surface slanted inward in the width direction.
Figure 16:
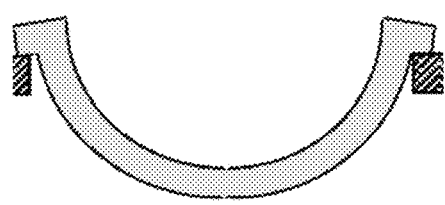
FIG. 16 is a diagram schematically illustrating a cross section of the lower half of inner casing taken across the surface perpendicular to the axial direction with the flange surface slanted outward in the width direction.

FIG. 13 is a diagram illustrating an example of measurement results for the flange surface. Additionally, FIGS. 14 to 16 are diagrams schematically illustrating a cross section of the lower half of inner casing taken across a surface perpendicular to the axial direction.

As illustrated in FIG. 13, the measurement is performed in the width direction of the flange surface at positions such as positions D and E in the axial direction where the displacement of the flange surface is significant. With a large amount of displacement of the flange surface, variation in displacement may also be significant in the width direction of the flange surface. The flange portion may be displaced in the width direction, and the amount of the displacement is predicted to vary depending on position in the axial direction. On the other hand, at positions determined to involve a large amount of displacement in a case where the flange surface is measured along the axial direction, the amount of displacement is likely to be large in the width direction. Thus, in the present embodiment, the flange surface is measured along the width direction at positions such as positions D and E in the axial direction whether the flange surface is significantly displaced. Thus, compared to a case with no deformation in the width direction as illustrated in FIG. 14, deformation into a shape slanted inward as illustrated in FIG. 15 or deformation into a shape slanted outward as illustrated in FIG. 16 can be recognized, and the amount of the deformation, i.e., amount of displacement, can be determined.

The remaining part of the configuration is similar to the corresponding part of the first embodiment.

The present embodiment configured as described above produces advantages similar to the advantages of the first embodiment.

Additionally, the flange surface is measured along the width direction at positions where the amount of displacement may vary along the width direction in a case where the flange surface is viewed in the width direction, thus allowing the measurement accuracy to be increased with extension of the measurement time suppressed.

Addition

Note that the present invention is not limited to the above-described embodiments and includes various modified examples and combinations without departing from the spirits of the present invention. The present invention is not limited to a configuration including all of the components described above in the embodiments, and includes a configuration in which some of the components are omitted. Some or all of the above-described components, functions, and the like may be implemented by, for example, being designed using, for example, an integrated circuit. The above-described components, functions, and the like may be implemented in software by a processor interpreting and executing programs realizing the respective functions.

DESCRIPTION OF REFERENCE CHARACTERS

1: Lower half of outer casing
2: Upper half of outer casing
3, 4: Flange surface
5, 9: Bolt hole
11: Lower half of inner casing
12: Upper half of inner casing
13, 14: Flange surface
15, 19: Bolt Hole
20, 21, 30, 31: Flange portion
32: Protruding portion
33: Recessed portions
100: Outer casing
200: Inner casing
300: Measurement system
301: Point probe
301a: Probe main body
301b: Probe member
302: Probe position sensor
303: Controller
304: Speaker
312: Laser light

What is claimed is:

1. A method for measuring a turbine shape of a turbine including a casing having an upper half casing and a lower half casing with respective flange portions joined by bolts, a stationary body housed inside the casing, and a rotating body housed inside the casing and rotating with respect to the stationary body, the method comprising:

measuring, along an axial direction, recesses and protrusions on respective contact surfaces of the flange portions of the casing disassembled into the upper half casing and the lower half casing at an interval equal to or smaller than a measurement interval M predetermined on a basis of an entire length of the flange portions in the axial direction, the number of bolts joining the flange portions, and an interval between the bolts in the axial direction of the flange portions and, assuming that L denotes the entire length of the flange portions in the axial direction, N denotes the number of the bolts, and Pmi and Pma denote a minimum value and a maximum value for the interval between the bolts in the axial direction of the flange portion, the measurement interval M are represented by:

$M = L/N \times (Pmi/Pma)$.

2. A measurement system for a turbine including a casing having an upper half casing and a lower half casing with respective flange portions joined by bolts, a stationary body housed inside the casing, and a rotating body housed inside the casing and rotating with respect to the stationary body, the measurement system measuring recesses and protrusions on respective contact surfaces of the flange portions of the casing disassembled into the upper half casing and the lower half casing, the measurement system comprising:

a point probe including a probe main body and a rod-shaped probe member having a base end fixed to the probe main body and a tip in contact with a measurement object;

a probe position sensor sensing a position and a direction of the point probe in a predetermined coordinate system including the casing; and a controller calculating a position of the tip of the probe member in the coordinate system on a basis of a sensing result from the probe position sensor, wherein the controller notifies, via a notification device, an operator that the tip of the probe member is close to one of measurement points, the measurement points being set at an interval equal to or smaller than a predetermined measurement interval based on an entire length of the flange portions in an axial direction, the number of bolts joining the flange portions, and intervals between the bolts in the axial direction of the flange portions and being set along an axial direction on respective contact surfaces of the flange portions of the casing disassembled into the upper half casing and the lower half casing, in a case where a distance between the tip of the probe member and the one of the measurement points is within a predetermined range and assuming that L denotes the entire length of the flange portions in the axial direction, N denotes the number of the bolts, Pmi and Pma denote a minimum value and a maximum value for the interval between the bolts in the axial direction of the flange portion, and Z denotes the weight variable (set to vary on the basis of areal temperature or any other factor), the measurement interval M are represented by:

$M = L/N \times (Pmi/Pma) \times Z$.

* * * * *